3,840,488
LATEX WITH IMPROVED FLAME RESISTANCE AND STABILITY

Paul J. Steinwand, Placentia, Calif., assignor to Union Oil Company of California, Los Angeles, Calif.
No Drawing. Filed Aug. 28, 1972, Ser. No. 284,037
Int. Cl. C08d 7/10; C09d 51/18
U.S. Cl. 260—29.7 P    22 Claims

ABSTRACT OF THE DISCLOSURE

An aqueous latex of a rubbery butadiene-styrene polymer which is particularly suited for textile treatment and application to carpet backing is described. The polymer contains fire retardant additives and is prepared by copolymerization of major amounts of butadiene and styrene with a minor amount of an aliphatic unsaturated acid and, optionally, copolymerizable amounts of an N-alkylol alkenyl amide. The latex is useful for textile treatment and for use as carpet backing and has fire retardant additives incorporated therein for reducing the flamability of fabrics and carpets treated with the latex. It has been found that the use of a conventional fire retardant, which comprises a mixture of ammonium halide salts and urea, drastically reduces the viscosity of the latex and renders it difficult to apply to textiles. It has further been discovered that the addition of another flame retardant concurrently with the aforementioned ammonium salts and urea results in stability of the viscosity of the latex. The other material which achieves this purpose comprises a halo alkyl phosphoric acid. Accordingly, this invention comprises a latex of styrene and butadiene with flame retarding amounts of an ammonium salt, urea and a halo alkyl phosphoric acid.

DESCRIPTION OF THE INVENTION

This invention relates to an aqueous latex of a rubbery polymer and, in particular, relates to an aqueous latex of butadiene and styrene which is suitable for application to carpeting as well as to paper and textile.

Latexes of rubbery polymers are commonly used in the manufacture of carpeting. The carpeting is commonly manufactured by mechanical interlinking of a fiber backing with loops of fibers which are inserted into a jute textile or which are distributed over a jute backing and then randomly punched through the jute so that some fibers penetrate the jute backing. The under surface of the jute is covered with a layer of a latex of a rubbery polymer which serves to impart stiffness and substance to the carpet as well as to cement the fibers securely to the jute backing.

The aqueous latexes of rubbery polymers are generally admixed with suitable inert fillers and the mixture is applied to the backing of a textile bearing the tufts or loops of the carpet fiber. The coated backing is then laminated against another textile, referred to as the scrim, and the laminate is passed through a roller and into a drying oven. The entire operation is performed continuously with the laminate of the carpet and scrim being in an oven for a period of about 3–15 minutes at a temperature of about 250° to 400° F. Frequently the carpet is scrubbed with aqueous detergent after its fabrication and it is therefore important that the rubbery polymer which cements the laminate together have a high water resistance. Hot strength of the rubbery polymer, as well as quick adhesiveness (quick grab), is also necessary to maintain the integrity of the laminate as it passes over the rollers in the baking oven.

It is known that carboxylic acid groups can be incorporated in a rubbery polymer by the interpolymerization of an unsaturated carboxylic acid comonomer and that such carboxylic acids promote internal crosslinking of the films prepared from the latex and also enhance the adhesiveness of the films to a substrate.

It has also been known that self-curing or crosslinking properties can be imparted to a latex without need for addition of a crosslinking catalyst by incorpartion in the polymer of a functional comonomer such as N-methylolacrylamide for N-methylolmethacrylamide.

It is also known that flame retardant characteristics can be imparted to cellulosic fibers or textiles by impregnation of the fiber or textile with a mixture of an ammonium salt such as ammonium bromide and urea. These are generally used in approximately equal weight proportions.

It would be desirable to incorporate the flame retarding additives in a latex of a rubbery polymer so that the fire retardant chemicals are applied with the latex and are bonded by the rubbery polymer to the textile, thereby imparting a water resistance to the flame retardancy of the textile. I have observed, however, that when these additives are incorporated in a latex in sufficient quantity to achieve the flame retardancy, the viscosity of the latex becomes very unstable and a marked decrease in viscosity occurs rapidly after the addition of the chemicals to the latex.

Proper viscosity of the latex during its application to the carpet backing is essential to efficient manufacture of the carpeting. If the viscosity of the latex is too low, there is a tendency for the latex to penetrate through the backing of the carpeting and to coat the exposed fibers or tufts. This, of course, renders the carpet unsuitable for use. In addition, failure to maintain a constant viscosity of the latex during its application prevents an accurate and controlled distribution of the latex onto the carpet backing.

It is thereby an object of this invention to incorporate flame retardant chemicals in the latex of a rubbery polymer while maintaining the latex suitable for use in textile treatment and carpet backing.

It is also an object of this invention to provide such a latex of a rubbery polymer with fire retardant chemicals and improved stability and physical properties.

It is similarly an object of this invention to provide such a latex with improved viscosity stability.

Other and related objects will be apparent from the following description of the invention.

I have now found that the undesirable decrease in viscosity of rubbery polymer latexes which is observed when ammonium salt and/or urea are incorporated in the latex in sufficient quantities to impart fire retardancy thereto can be prevented by the incorporation in the latex of an additional fire retardant material. The material which I have found useful in this regard is a halo alkyl phosphoric acid or salt thereof. The salt is the preferred additive since its use avoids instability of the latex which can be caused by the addition of an acidic material. The addition of the salt of the halo alkyl phosphoric acid together with ammonium bromide and urea results in a formation of a latex having a polymer which has significantly increased fire retardancy. In addition, the latex has a stable viscosity which is a marked improvement over the viscosity characteristics of latexes prepared by the addition of the ammonium bromide and urea or the addition of the halo alkyl phosphoric acid. These additives thereby function in combination to achieve results which are not obtainable by either alone; each of these additives serving to contribute to the fire retardancy of polymers prepared from the latex and the combination of the additives cooperating to eliminate any undesired effects of the individual materials on the viscosity of the latex.

The fire retardants are added to performed latexes which comprise aqueous dispersions of polymers of butadiene and styrene. These major comonomers are present in the polymer in proportions from about 15:85 to 65:35 weight parts butadiene to styrene with a minor amount, from about 0.05 to about 5 parts per 100 parts of the major comonomers, of an alpha,beta-ethylenically unsaturated $C_3$ to $C_6$ alkenoic or alkendioic acid. Optionally, the latex can also contain from 0.01 to about 2.5 weight parts per 100 parts of said major comonomers of a N-$C_1$ to $C_5$ alkylol substituted alpha,beta-ethylenically unsaturated $C_3$ to $C_6$ alkenyl amide.

The latexes are prepared by conventional emulsion copolymerization of butadiene, styrene and the alkenyl carboxylic acid with the optional amounts of the N-alkylol alkenyl amide. The comonomers are dispersed in an aqueous polymerization medium by the use of suitable oil-in-water surfcatants. The copolymerization is initiated with a water soluble, free radical catalyst which can be thermally decomposed or can be used in combination with a reducing agent to form the free radical species that initiate polymerization. As is common with conventional practice, a mercaptan or other reaction modifier can be incorporated in the polymerization medium to function as a chain transfer agent and thereby control the molecular weight of the product.

Table 1 summarizes the comonomers that can be used and their proportions in weight parts per 100 weight parts of the major comonomers, i.e., butadiene and styrene. In addition, the table also summarizes the various amounts in which the optional components and catalysts can be employed in preparation of the latex compositions.

TABLE 1

| Component | Broad | Preferred | Most preferred |
|---|---|---|---|
| Butadiene | 65-15 | 65-35 | 55-35 |
| Styrene | 35-85 | 35-65 | 45-65 |
| Alkenyl acid | 0.4-5.0 | 0.5-2.0 | 0.5-2.0 |
| Surfactant | 1.0-5.0 | 1.8-3.0 | 2.0-3.0 |
| Buffering agent | 0-2.0 | 0.1-1.5 | 0.1-0.2 |
| Chain transfer agent | 0-5.0 | 0.3-0.5 | 0.3-0.5 |
| Catalyst | 0.1-5.0 | 0.3-0.5 | 0.3-0.5 |

The choice of the proportions of the major comonomers within the aforecited ranges depends somewhat on the desired physical properties of the cured films prepared from the latexes. When relatively stiff or hard films are desired, higher proportions of styrene are employed and when relatively soft and flexible films are desired, higher proportions of butadiene are used.

The unsaturated carboxylic acids, which are used to impart adhesiveness and bond strength to the films prepared from the latex composition, are mono-ethylenically unsaturated or alkenoic and alkendioic acids having from 3 to about 6 carbons. Examples of such acids include acrylic, methacrylic, crotonic, vinyl acetic, tiglic, angelic, senesioic, hexanoic, tetracrylic, maleic, fumaric, citroconic, mesaconic, itaconic, glutaconic, muconic acids, etc. Generally, the lower molecular weight acids are preferred such as acrylic acid of the alkenoic and fumaric or itaconic acids of the alkendioic acids. The amount of the carboxylic acid comonomer is from about 0.4 to 5.0 weight percent. Preferably, the carboxylic acid is used in the minimum quantity necessary to effect the desired adhesiveness of the film prepared from the latex.

The crosslinking of the polymer after application of the latex to a substrate can be enhanced by incorporating a minor amount of an N-alkylol alkenyl amide in the polymer during preparation of the latex.

The N-alkylol alkenyl amides include $C_3$ to $C_6$ alkenyl amides which are substituted on their nitrogen by a $C_1$ to $C_5$ alkylol group, e.g., methylol, ethylol, propylol, pentylol, etc. Examples of suitable N-alkylol alkenyl amides are N-methylolacrylamide, N-propylolacrylamide, N-butylolacrylamide, N-methylolmethacrylamide, N-methylolmaleimide, N-methylolcrotonamide, N-ethyloliscrotonamide, etc. Of these, N-methylolacrylamide is preferred. The amide can be added to the mixture of comonomers, catalyst and surfactant that are introduced into the polymerization zone. When used, the amount of amide can be from 0.05 to 3.5, preferably from 0.1 to 2.0 parts per hundred parts of major comonomers.

The oil-in-water surfactant which is used to effect the dispersion or emulsification of the comonomers in the polymerization medium and which maintains the emulsion of the resulting polymeric latex can be an anionic, nonionic or combinations of anionic and nonionic surfactants.

Examples of suitable anionic surfactants include compounds obtained by sulfonation of fatty derivatives such as sulfonated tallow, sulfonated vegetable oils, sulfonated marine animal oils, sulfonated fatty acid esters of mono- and polyvalent alcohols such as the sulfonated butyl ester of abietic acid, sulfonated polyol glycerides, etc. Sulfated and sulfonated fatty alcohols can also be used such as sodium valerylsulfate, sodium acetylsulfate, sodium oleylsulfate, tetradecylsulfate, ammonium heptadecyl sulfonate, etc. Other useful anionic surfactants include the linear alkyl benzene sulfonates which have an essentially linear alkyl chain having from about 6 to 18 carbons. One or two of these alkyl groups can be attached to the benzene ring which is sulfonated to form the surfactant composition. Examples of suitable surfactants include hexylbenzene sulfonate, dihexylbenzene sulfonate, octylbenzene sulfonate, isooctyl benzene sulfonate, dodecylbenzene sulfonate, undecylbenzene sulfonate, tetradecylbenzene sulfonate, hexadecylbenzene, sulfonate, octadecylbenzene sulfonate, etc.

A particularly useful class of anionic surfactants which can be employed comprise the $C_1$ to $C_{12}$ alkyl and $C_5$ to $C_8$ cycloalkyl esters of alkali metal sulfoalkanedioic acids having from 3 to about 6 carbons. Examples of these include the diethylsodium sulfosuccinate, di-n-cotylpotassium sulfosuccinate, dicyclohexyllithium sulfoglutarate, dicyclopentylsodium sulfoadipate, diisopropyllithium sulfomalonate, disodium sulfomalonate, diamylsodium sulfoadipate, etc.

A single surfactant from the aforementioned anionic surfactants can be used or mixtures of two or more of these aforementioned anionic surfactants can also be used. A particularly useful combination includes the combination of a linear alkylbenzene sulfonate and an alkyl or cycloalkyl ester of a sulfodicarboxylic acid. When mixtures of two or more anionic surfactants are employed, the total amount of the anionic surfactant set forth in the preceding table can be divided between the individual components of this surfactant mixture as desired.

A nonionic surfactant can also be used in lieu of or in combination with the aforementioned anionic surfactant. Examples of suitable nonionics which can be used include ethylene oxide condensation products with fatty acids such as lauric acid, oleic acid, stearic acid, etc. Ethylene oxide condensation products with fatty and resin alcohols are also suitable such as polyoxyethylene lauryl ether, the ethylene oxide condensate with hydryl abietyl alcohol, etc. Other examples include ethylene oxide condensates with alkyl and alkenyl phenols such as ethylene oxide condensate with dodecyl and isododecyl phenol, octyl phenoxy polyethoxy ethanol, etc. Other ethylene oxide condensation products include those with fatty amines and amides having from about 8 to 18 carbons as well as the fatty acid partial esters of hexitans, e.g., polyoxyethylene derivatives of sorbitan monolaurate, sorbitan monopalmitate, sorbitan monostearate, sorbitan monooleate, sorbitan trioleate, etc.

The polymerization is initiated by a water soluble free radical initiator such as a water soluble peracid and salt thereof, e.g., hydrogen peroxide, sodium peroxide, lithium peroxide, peracetic acid, persulfuric acid, or the ammonium and alkali metal salts thereof, e.g., ammonium persulfate, sodium peracetate, lithium persulfate, potassium persulfate, etc. A free radical initiator can be used alone and thermally decomposed to release the free radical initiating species or can be used in combination with a suitable reducing agent in a redox couple. The reducing agent is typically a salt of a multivalent metal in a lower oxidation state, e.g., ferrous chloride, cuprous sulfate, etc., or an oxidizable sulfur compound such as an alkali metal metabisulfite. The presence of the redox agent in the polymerization medium achieves a release of free radicals at a lower temperature than necessary in its absence and thereby promotes formation of higher molecular weight copolymer products.

Various polymerization techniques can be employed to obtain the most desirable polymer product. These techniques which are commonly practiced in the art include the use of primary, secondary and tertiary aliphatic mercaptans having from about 5 to about 12 carbon atoms in the polymerization medium at a concentration from about 0.01 to about 0.5 to modify the polymerization. The reaction medium can also be buffered and the polymerization controlled by the presence of suitable materials such as diammonium orthophosphate, tetrasodium pyrophosphate, sodium carbonate, potassium bicarbonate, sodium acetate, etc.

The polymerization is preferably performed in a batch process using a kettle equipped with cooling means, commonly a jacketed kettle, and a stirrer to maintain intimate admixing of the liquid reactants. The pressure can be from 1 to 100 atmospheres and sufficient to maintain liquid phase conditions. The temperature can be from about 35° F. to 200° F., preferably from about 100° F. to 175° F. The polymerization is started by charging water to the vessel and adding the surfactant and buffering agent in the necessary quantities for the polymerization. The catalyst and one of the monomers, e.g., styrene, is charged to the reactor and thereafter the butadiene is slowly added while preventing any air contamination of the reactor. When polymers are to be prepared with proportions of styrene, e.g., ratios of butadiene to styrene from 35:65 to 15:85, some of the styrene can be delay added, i.e., added to the polymerization zone continuously or incrementally during the polymerization. The functional monomers, i.e., the unsaturated carboxylic acid and the N-alkylol unsaturated amide when used, can be added to the polymerization medium at their aforementioned concentration and/or can be continuously added during the polymerization to maintain their concentration constant throughout the polymerization period. The reactor, prior to the monomer and catalyst introduction, is preferably evacuated and all subsequent additions are made wtih caution to avoid introducing oxygen into the reaction zone. The mercaptan reaction modifier can be added together with the styrene. The catalyst and reactants are stirred sufficiently to thoroughly agitate the contents and the reactor is slowly heated to the reaction temperature, preferably from about 125° to about 150° F., to initiate the reaction. After initiation of the reaction the temperature is maintained by cooling the reactor and the polymerization is performed to achieve a latex composition having from about 30 to about 50 weight percent solids content. In a preferred embodiment, the temperature of the polymerization is raised approximately 5° to 25° F. midway through the polymerization to compensate for the diminished concentration of initiator so as to achieve a more complete reaction of the comonomers present. The carboxylic acid and an alkylolamine functional comonomer are incorporated in the polymerization medium together with the styrene comonomer to which therafter is added the butadiene.

The latexes usually have an acidic pH when initially prepared. Their maximum stability, however, is achieved at alkaline pH values from 7.5 to 10, preferably from 8 to 9.5. Accordingly, sufficient alkaline material such as ammonia, aqua ammonia or an alkali metal hydroxide can be added to raise the pH of the latex to the desired stable value.

The latexes are prepared to have as high solids content as attainable without encountering instability or excessively high viscosities. Generally the solids content is above 35 and preferably is above 40 weight percent. The maximum solids content reached during polymerization is generally below 50. The latex can thereafter be concentrated by evaporation to raise the solids content to a value from 50 to about 55 weight percent.

The aforementioned latex compositions are used for textile treatment and are commonly compounded with inorganic or mineral fillers, extended pigments or the like, to prepare an impregnating composition. Examples of various materials are calcium carbonate, clay, talc, asbestos, mica, sand, glass microbeads, etc. The fillers should be finely subdivided, generally in the form of powders passing at least about a 100 mesh screen, preferably passing a 200 mesh screen. An example of a commercially available material is Marblewhite 200 which is a calcium carbonate powder passing a 200 mesh screen. The inorganic materials are incorporated at concentrations from about 30 to about 90 weight percent of the impregnating composition, preferably from about 55 to about 80 weight percent of the impregnating composition.

Various thickening agents are also incorporated in the composition which is used to treat the textile or rough backing. Examples of various thickening agents include water-soluble resins such as sodium carboxymethylcellulose, polyvinyl alcohol, sodium polyacrylate and other water soluble gums. These materials are incorporated in the impregnating composition in concentrations from about 0.02 to about 0.50, preferably from 0.05 to about 0.20 weight percent of the total composition.

It is preferred to add to the latex after its formation a dispersant for the filler. Suitable dispersants are any of the aforementioned surfactants or an alkali metal polyphosphate such as tetrasodium pyrophosphate, pentapotassium tripolyphosphate, hexasodium hexametaphosphate, disodium dipotassium pyrophosphate, etc. The dispersant is employed in an amount effective to aid the dispersion of the thickening agent, e.g., an amount from 0.1 to about 2 weight percent, preferably from 0.2 to 1 weight percent, based on the dry, i.e., solids, weight of the latex. A preferred class of surfactants are the anionic type, particularly polymeric carboxylic acids or polymerized alkaryl sulfonic acids and the ammonium, alkali metal or alkaline earth metal salts thereof. Examples of commercially available surfactants of this class are the Daxad series which are sodium, ammonium, calcium or potassium salts of polymerized alkyl and sulfonic acids; Darvan series which are sodium salts of the formaldehyde condensate of alkyl benzene or naphthalene sulfonic acids or the sodium salt of a carboxylated polyelectrolyte; Tamol 731 and 850 which are sodium salts of polymeric carboxylic acids; and Tamol N and SN which are sodium salts of condensed naphthalene sulfonic acids.

The mixture of the mineral filler, thickening agent, dispersant and any other materials which is the impregnating composition should have a solids content from 65 to about 80, preferably from 70 to about 77 weight percent. Water is added as necessary to adjust the solids content to this range, either before or during the mixing of the aforementioned ingredients or immediately thereafter.

As previously mentioned, this invention comprises the incorporation of various fire retardants in the latex or in the impregnating emulsion to impart fire retardant propetries to textiles and materials treated with the composition. These materials can be incorporated in the latex during its manufacture or can be added during compounding of the latex, filler and thickener in the manufacture of the impregnating composition from the latex. One of the ingredients, which is a commonly used fire retardant for treating of textiles, is actually a mixture of two inorganic materials. These materials are urea and ammonium bromide. The urea and ammonium bromide can be in mixtures comprising from 1:3 to about 3:1 weight parts of each of the ingredients. Commonly, the materials are used in equal weight amounts. It has been found that the ammonium bromide and urea can also be incorporated in the impregnating composition by their addition thereto or to the latex from which the composition is prepared and fire retardancy will be imparted to textiles treated with the latex. Effective amounts of the mixture of these materials is from 0.1 to about 20, preferably from 1 to 10 weight percent, based on the polymer weight of the latex.

The addition of the aforementioned inorganic materials to the latex will be observed to exhibit a detrimental effect on the viscosity of impregnating compositions prepared therefrom. Typically, the impregnating composition is prepared so as to be fairly thixotropic and exhibit a high viscosity. Presence of the aforedescribed amounts of the ammonium bromide and urea mixtures results in a substantial loss of viscosity of the impregnating compositions prepared from the latex. This loss occurs usually within 24 hours after preparation of the impregnating composition. The high viscosity is desirable to permit even application of the impregnating composition across the textile and to insure that the impregnating composition does not extrude or penetrate through the textile. Thus, when the scrim of a carpet backing is laminated against the coating of latex, the impregnating latex composition has a sufficiently high viscosity so as not to extrude through and between the fibers of the jute backing and wet the tuft fibers of the carpet. Generally, viscosities from about 6500 to 20,000 centipoises measured at 70° F. are suitable with viscosities from 8000 to about 13,000 being preferred.

A second fire retardant ingredient is incorporated in the latex or in the impregnating composition and it has been observed that this second ingredient not only contributes fire retardancy to textiles and carpets, but also offsets or prevents the decrease in viscosity which is caused by the aforementioned inorganic fire retardant additives. The second ingredient which is used in accordance with this invention comprises a halo alkyl phosphoric acid, typically a bromoalkyl substituted phosphoric acid, and/or the ammonium or alkali metal salts thereof. The phosphoric acid can be substituted with two or three halo alkyl groups having from 1 to about 5 carbons and from 1 to about 3 chloride or bromide atoms. Typical examples of these are bis(2,3-dibromopropyl)phosphoric acid, bis(2,2-dibromoethyl)phosphoric acid, tris(1,2,3-tribromopropyl)phosphonic acid, bis(2,3-dibromobutyl)phosphoric acid, bis(2,3-dichloroamyl)phosphoric acid, tris(dibromomethyl)phosphoric acid, etc.

A commercially available material which can be used for this purpose is known as Bis Acid, manufactured by the Michigan Chemical Company, which is a solution of bis(2,3-dibromopropyl)phosphoric acid. The aforementioned phosphoric acid derivative can be incorporated in an amount from about 0.1 to about 20, preferably from about 1 to about 10 weight percent based on the final weight of the solids content, i.e., polymer weight of the latex. It will be observed that the use of this material at the aforementioned concentration in combination with the aforementioned inorganic fire retardant additives will achieve fire retardancy without any undesirable effect on the viscosity of the material. Most latexes of rubbery polymers, particularly of polymers bearing carboxylic acid groups, are sensitive to acids or alkali. The latexes are routinely treated to adjust their pH value to between about 7.5 and 10, preferably about 8 and 9.5, to insure their stability. When the phosphoric acid ingredient is added to such stabilized latex, care should be taken not to alter the pH of the latex. Accordingly, it is preferred to employ the ammonium and alkali metal salts of the phosphoric acid ingredient.

EXAMPLE 1

A typical butadiene-styrene latex composition used for carpet manufacture was employed in the Examples. The latex comprised a butadiene-styrene latex with 50:50 weight ratio of butadiene to styrene. The latex also contained 0.9 percent of an ethylenically unsaturated carboxylic acid, acrylic acid, to enhance the adhesivness of the composition.

Fire retardants were added to the latex before adding the filler and thickener. Urea was added to the latex as a 50 percent soltuion in water. Ammonium bromide was added to the latex as an aqueous solution at pH 9; the solution contained 25 weight percent ammonium bromide and sufficient ammonium hydroxide to adjust to pH 9. Bis Acid was added as its ammonium salt in aqueous solution at pH 9; the solution was made up from 40 grams Bis Acid per 100 grams of solution at pH 9. When desired, antimony axide, $Sb_2O_3$, was added to the latex as a dry powder and dispersed along with the calcium carbonate.

An impregnating composition was prepared by admixing 375 parts calcium carbonate, 100 dry parts of the aforementioned latex composition containing the desired fire retardant additives, and adding a sufficient amount of water to achieve a final solids content of 75 weight percent. The composition was degassed or deaerated by addition of 2 drops of Drew Y-160 defoamer and by agitating for about ten minutes, and thereafter 0.4 to 0.7 dry weight parts per 100 dry parts of the latex of a sodium polyacrylate was added. The polyacrylate was a commercial product known as Jorco 1010–8 and was an 8 percent solution of a high molecular weight sodium polyacrylate in water.

Table 2 summarizes the experiments and the results obtained:

TABLE 2

| Run number | Impregnating composition (grams) | Ammonium bromide | Urea | Bis acid | $Sb_2O_3$ | Thickener (grams) | Viscosity Initial | Viscosity After 24 hrs. | Flame retardancy |
|---|---|---|---|---|---|---|---|---|---|
| 1 | 90 | 5 | 5 | 0 | 0 | 0.49 | 9,800 | 5,280 | [1] 20.0 |
| 2 | 95 | 2.5 | 2.5 | 0 | 0 | 0.40 | 7,600 | 4,740 | [1] 18.4 |
| 3 | 90 | 2.5 | 2.5 | 5 | 10 | 0.52 | 9,800 | 9,800 | 18.4 |
| 4 | 94 | 1.5 | 1.5 | 3.0 | 3.0 | 0.56 | 13,880 | 13,220 | 18.7 |
| 5 | 90 | 0 | 0 | 10 | 0 | 0.68 | 9,400 | 12,020 | |
| 6 | 100 | 0 | 0 | 0 | 0 | 0.40 | 8,000 | 8,000 | 17.0 |
| 7 | 95 | 0 | 5 | 0 | 0 | 0.50 | 9,800 | 11,500 | 19.0 |
| 8 | [2] 90 | .5 | 5 | 0 | 0 | 0.36 | 7,200 | 3,100 | |
| 9 | 97 | 0.75 | 0.75 | 1.5 | 0 | 0.56 | 13,410 | 14,640 | 18.0 |
| 10 | 94 | 1.5 | 1.5 | 3.0 | 1.5 | 0.51 | 13,000 | 12,680 | 18.7 |

[1] Estimated from other experiments.
[2] Sample of a commercial latex.

The preceding illustrative description of the invention has been set forth only to illustrate a preferred mode of the invention. It is not intended that this specific illustration be construed as unduly limiting of the invention. Instead, it is intended that the invention be defined by the ingredients and obvious equivalents set forth in the following claims.

We claim:

1. A latex comprising: water; from 40 to about 55 weight percent of a copolymer of from 15 to 65 parts butadiene, 85 to 35 parts styrene and 0.1 to 5.0 parts of an unsaturated acid selected from the class consisting of $C_3$ to $C_6$ mono-ethylenically unsaturated alkenoic and alkendioic acid per 100 parts of butadiene and styrene; from 1 to about 10 weight parts per 100 parts of said butadiene and styrene of an anionic or nonionic surfactant or mixtures thereof; and fire-retardant additives consisting essentially of an amount from 0.1 to 20 weight percent based on the polymer content effective to impart fire retardancy properties to films prepared from the latex of a mixture of ammonium bromide and urea in proportions of 1:3 to 3:1; and an amount from about 0.1 to 20 weight percent based on the copolymer content effective to inhibit loss of viscosity of impregnating compositions prepared from the latex of a halo-substituted alkyl phosphoric acid having two or three alkyl groups, each with 1 to about 5 carbons and 1 to about 3 bromide or chloride atoms.

2. The latex of claim 1 which contains a sufficient amount of ammonia or an alkali metal hydroxide to impart a pH value from 7.5 to about 10 thereto.

3. The latex of claim 2 wherein said ammonium bromide and urea are present in about equal weight proportions.

4. The latex of claim 2 wherein said alkyl phosphoric acid is bis(2,3-dibromopropyl)phosphoric acid.

5. The latex of claim 2 wherein said copolymer also contains, in an amount from 0.05 to 3.5 weight parts per 100 weight parts of said major comonomers, of an interpolymerized N-alkylol alkenyl amide having 3 to 6 carbons in the amide group and 1 to 5 carbons in the alkylol group.

6. The latex of claim 5 wherein said N-alkylol alkenyl amide is N-methylol acrylamide.

7. The latex of claim 6 wherein said unsaturated acid is acrylic acid.

8. The latex of claim 6 wherein said unsaturated acid is fumaric acid.

9. The latex of claim 2 wherein said unsaturated acid is itaconic acid.

10. The latex of claim 5 wherein said butadiene and styrene are present in weight proportions of 65:35 and 35:65, respectively.

11. An impregnating composition comprising: the latex of claim 2, from 30 to 90 weight percent of finely subdivided calcium carbonate, clay, talc, asbestos, mica, sand or glass microbeads, from 0.02 to about 0.5 weight percent of sodium carboxymethyl cellulose, polyvinyl alcohol or sodium polyacrylate, and sufficient water to provide a solids content from 65 to 80 weight percent.

12. The impregnating composition of claim 11 wherein an anionic surfactant or an alkali metal polyphosphate is also present at a concentration from 0.1 to about 2 weight percent of said copolymer.

13. The impregnating composition of claim 11 wherein said ammonium bromide and urea are present in about equal weight proportions.

14. The impregnating composition of claim 13 wherein said alkyl phosphoric acid is bis(2,3-dibromopropyl)phosphoric acid.

15. The impregnating composition of claim 14 wherein said copolymer also contains, in an amount from 0.05 to 3.5 weight parts per 100 weight parts of said major comonomers, of an interpolymerized N-alkylol alkenyl amide having 3 to 6 carbons in the amide group and 1 to 5 carbons in the alkylol group.

16. The impregnating composition of claim 15 wherein said N-alkylol alkenyl amide is N-methylol acrylamide.

17. The impregnating composition of claim 16 wherein said unsaturated acid is acrylic acid.

18. The impregnating composition of claim 17 wherein said butadiene and styrene are present in weight proportion of 55:35 and 45:65, respectively.

19. An impregnating composition consisting essentially of: a copolymer of from 15 to 65 parts butadiene, 85 to 35 parts styrene and 0.1 to 5.0 parts of a $C_3$ to $C_6$ mono-ethylenically unsaturated acid per 100 parts of butadiene and styrene, said acid being selected from alkenoic and alkendioic acids; from 1 to about 10 weight parts per 100 parts of said butadiene and styrene of an anionic or nonionic surfactant or mixtures thereof; from 0.1 to 20 weight percent based on the copolymer content of a mixture of ammonium bromide and urea in proportions of 1:3 to 3:1; from about 0.1 to about 20 weight percent based on the copolymer content of a halo-substituted alkyl phosphoric acid having 2 or 3 alkyl groups, each with 1 to about 5 carbons and 1 to about 3 bromide or chloride atoms; from 30 to 90 weight percent based on said composition of finely subdivided calcium carbonate, clay, talc, asbestos, mica, sand or glass microbeads, from 0.02 to about 0.5 weight percent based on said composition of sodium carboxymethyl cellulose, polyvinyl alcohol or sodium polyacrylate, from 0 to 10 weight percent based on said composition of antimony oxide, and sufficient water to provide a solids content from 65 to 80 weight percent based on said composition.

20. The impregnating composition of claim 19 wherein said composition also consists of from 0.1 to about 2 weight percent, based on the weight of said copolymer of an alkali metal polyphosphate.

21. The impregnating composition of claim 19 wherein said unsaturated acid is acrylic acid.

22. The impregnating composition of claim 19 wherein said unsaturated acid is itaconic acid.

References Cited

UNITED STATES PATENTS

| | | | |
|---|---|---|---|
| 2,917,476 | 12/1959 | Peterson et al. | 260—29.7 NQ |
| 3,445,404 | 5/1969 | Ronden et al. | 260—2.5 |
| 3,344,103 | 9/1967 | Eilbeck et al. | 260—29.7 T |
| 3,432,455 | 3/1969 | Rasicci | 260—29.7 T |
| 3,740,357 | 6/1973 | Wax | 260—2.5 L |
| 3,660,339 | 5/1972 | Schuh | 260—29.7 H |
| 3,676,389 | 7/1972 | Putnam et al. | 106—15 FP |

OTHER REFERENCES

Martens: *Emulsion and Water-Soluble Paints and Coatings* (Reinhold, 1964), pp. 141, 142.

Noble: *Latex in Industry* (Rubber Age, 1953, 2nd ed.), p. 410.

Lyons: *The Chemistry and Uses of Fire Retardants* (Wiley—Interscience, 1970), pp. 20–22.

ALLAN LIEBERMAN, Primary Examiner

T. DE BENEDICTIS, SR., Assistant Examiner

U.S. Cl. X.R.

106—15 FP; 117—137; 260—29.7 N, NQ, Dig. 24, 45.7 P, 45.9 R